United States Patent Office 3,847,953
Patented Nov. 12, 1974

3,847,953
ANTHRAQUINONE DERIVATIVES
Arthur D. Sill, Cincinnati, Ohio, and Robert W. Fleming, Ann Arbor, Mich., assignors to Richardson-Merrell Inc., New York, N.Y.
No Drawing. Filed Dec. 21, 1972, Ser. No. 317,239
Int. Cl. C07c 93/20
U.S. Cl. 260—376        6 Claims

ABSTRACT OF THE DISCLOSURE

Novel bis-basic esters of anthraquinone, their method of preparation, and their use as pharmaceutical agents for the prevention and inhibition of virus infections are disclosed.

FIELD OF THE INVENTION

The subject matter of the present invention relates to new organic chemical compounds, to methods of preparing such compounds, and to pharmaceutical compositions which contain these compounds as the active ingredient. The anthraquinone derivatives described herein are useful antiviral agents which inhibit or inactivate viruses by their administration to either an infected or a non-infected host.

BACKGROUND OF THE INVENTION

There is a growing body of information that viruses play a vital role in a broad range of diseases, some of which represent the most serious of man's ills. Arthritis, juvenile arthritis, diabetes, Hodgkin's disease and various immunological diseases and degenerative diseases of the central nervous system have been linked to viruses as the causative agents.

At present, the control of virus infections is primarily achieved by means of immunization vaccines. For example, poliomyelitis, smallpox, measles and influenza are well recognized diseases in which viral vaccines have proven effective. In general, however, viral vaccines have had only a moderate success in animal prophylaxis. Each vaccine acts primarily against a specific virus and is not heterophilic in the protection it offers. Hence, vaccines have not provided a practical solution against the wide array of infectious viruses, even where limited as for example, solely to respiratory viruses.

One approach to the control of virus-related diseases and, particularly to the spread of such virus diseases, has been to search for medicinal agents or chemotherapeutic agents which are capable of inhibiting the growth of viruses, thereby preventing the spread of disease as well as preventing further damage to cells and tissues of the animal host which have not as yet been infected. Heretofore, only a limited number of virus infections such as smallpox, Asian influenza and herpes keratitis have been prevented by chemical antiviral agents. Sulfonamides and antibiotics which have revolutionized the treatment of bacterial infections have substantially no effect upon virus infections. Certain infections caused by large viruses, such as lymphogranuloma venereum, psittacosis, and trachoma have been successfully treated using antibiotics and sulfa drugs. However, the majority of infections have not been responsive to attack by chemotherapeutic agents. Thus, it can be seen that there is a need for new chemotherapeutic agents which are effective against a broad range of virus diseases, and which at the same time, are non-toxic to the host.

As a result of a long series of investigations, applicants have discovered a novel class of compounds which are particularly useful as antiviral agents. U.S. Pats. 3,647,860 and 3,662,062 represent the closest art known to applicants and disclose esters and thioesters of fluorene, fluoren-9-ol and fluoren-9-one useful as antiviral agents. The bis-basic esters of anthraquinone described and claimed herein are derived from a totally different and unrelated aromatic ring system and represent novel compounds, which to applicants' knowledge have not previously been described nor reported in the literature. Additionally, the compounds of the present invention possess in varying degrees a wide spectrum of antiviral activity which could not have been predicted from a knowledge of the present state of the art.

SUMMARY OF THE INVENTION

This invention relates to new anthraquinone derivatives, to their method of preparation and to their use as pharmaceutical agents. More particularly, the compounds of the present invention are bis-basic-esters of anthraquinone which are useful in the prevention or inhibition of virus infections. Still more particularly, the compounds of the present invention may be represented by the following general formula:

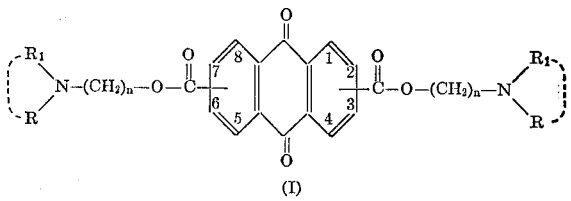

(I)

wherein $n$ is an integer of from 2 to 6; R and $R_1$ are each selected from the group consisting of hydrogen, lower alkyl having from 1 to 6 carbon atoms, cycloalkyl having from 3 to 6 carbon atoms, alkenyl having from 3 to 6 carbon atoms in which the unsaturation is in a position other than in the 1-position of the alkenyl group and when R and $R_1$ are taken together with the nitrogen atom to which they are attached represent the pyrrolidinyl, piperidino or morpholino radical; and the pharmaceutically acceptable acid addition salts thereof.

The tertiary amino bis-basic anthraquinone esters are prepared by esterification of the anthraquinone dicarboxylic acids or anthraquinone dicarbonylhalides using an aminoalkanol halide or an aminoalkanol, respectively, as indicated in the following general reaction scheme:

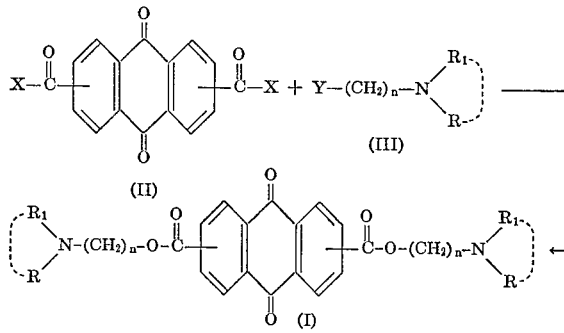

In the above reaction scheme, X and Y both represent hydroxyl, chlorine or bromine with the proviso that if X is hydroxyl then Y is chlorine or bromine, and if X is chlorine or bromine then Y is hydroxyl; and the symbols $n$, R and $R_1$ have the values previously assigned to them. The primary and secondary amino bis-basic anthraquinone esters are prepared similarly by reacting the corresponding anthraquinone dicarbonyl halides with the salt of an aminoalkanol.

To achieve an antiviral effect the compounds of this invention are administered to a suitable host using a variety of compositions. Such compositions may be administered either prior to infection, as a prophylactic use or treatment, or they may be therapeutically administered subsequent to infection of the host as a curative use or treatment.

A wide variety of compositions are within the scope of the present invention. Thus, the instant compounds may be applied externally or topically directly at the situs of the infection, or they may be administered internally or systemically, irrespective of whether the treatment is prophylactic or curative in nature. In either event, replication of the virus is inhibited or prevented with the concomitant result that the various disease symptoms characteristic of the pathogenic virus infection are no longer present.

DETAILED DESCRIPTION OF THE INVENTION

As can be seen from general formula (I) above, the compounds of the present invention include bis-basic esters of anthraquinone in which both side chains are linked to the benzenoid portions of the anthraquinone nucleus. Thus, one of the side chains is linked to the anthraquinone ring by a replacement of a single hydrogen atom in positions 1 through 4 of the benzenoid ring, whereas the second side chain is linked to the anthraquinone ring by a replacement of a hydrogen atom in positions 5 through 8. Preferably, one of the side chains is in the 1- or 2-position with the other side chain being in the 6- or 7-position. It is further apparent that the basic side chain consists of a basic amino function separated from the anthraquinone nucleus by an alkylene chain of prescribed length.

The basic amino function represented by the symbol

can be a primary, secondary or a tertiary amino group. Preferably, each amino group is a tertiary amine. The symbols R and $R_1$ represent either hydrogen or a lower alkyl group. The term lower alkyl as used herein with regard to the basic amino function relates to groups having from 1 to 6 carbon atoms. Illustrative of such groups can be mentioned both straight or branched chain alkyl radicals such as: methyl, ethyl, $n$-propyl, isopropyl, $n$-butyl, sec-butyl, isoamyl, $n$-pentyl and $n$-hexyl. When R and $R_1$ each represent lower alkyl, a preferred subgenus is formed.

Each R and $R_1$ can also represent a cycloalkyl group having from 3 to 6 carbon atoms. Illustrative of such groups are the cyclopropyl, cyclobutyl, cyclopentyl and cyclohexyl radicals.

The symbols R and $R_1$ also represent an alkenyl group having from 3 to 6 carbon atoms. In addition to the unsaturation which must be present, this unsaturation must be in a position other than the 1-position of the alkenyl group in order to prevent hydrolysis from occurring. Illustrative of such groups are the allyl, 3-butenyl and the 4-hexenyl radicals.

R and $R_1$ may also be joined with the nitrogen atom to which they are attached to represent various saturated monocyclic, heterocyclic radicals. Typical of such heterocyclic groups are the 1-pyrrolidinyl, piperidino or morpholino radicals. Compounds containing these groups are readily prepared and typify saturated monocyclic, heterocyclic radicals which are generally useful in lieu of the dilower alkylamino groups present in the compounds of this invention.

The alkylene chain which separates the amino function from the anthraquinone nucleus represents either a straight or branched alkylene chain. Additionally, each of the alkylene chains may be the same or different; preferably, however, both are the same. The alkylene chain consists of from 2 to 6 carbon atoms and separates the adjacent oxygen atom of the ester group from the amino nitrogen atom by at least 2 carbon atoms, i.e., the oxygen and amino nitrogen cannot share the same atom of the alkylene group. Illustrative of the various alkylene groups which are represented by the radical —$(CH_2)_n$— are: ethylene, 1,3-propylene, 1,4-butylene, 1,5-pentylene, 1,6-hexylene, 2-methyl-1,4-butylene and 3-methyl-1,5-pentylene.

Illustrative of the base compounds of the present invention represented by generic formula (I) can be mentioned:

bis(3-dibutylaminopropyl)anthraquinone-1,8-dicarboxylate,
bis(3-dibutylaminopropyl)anthraquinone-2,6-dicarboxylate,
bis(3-diethylaminopropyl)anthraquinone-2,6-dicarboxylate,
bis(3-dibutylaminopropyl)anthraquinone-1,5-dicarboxylate,
bis(4-ethylaminobutyl)anthraquinone-1,8-dicarboxylate,
bis(3-dicyclohexylaminopropyl)anthraquinone-2,6-dicarboxylate,
bis(3-diallylaminopropyl)anthraquinone-2,6-dicarboxylate,
bis(5-aminopentyl)anthraquinone-1,8-dicarboxylate,
bis(4-ethylaminobutyl)anthraquinone-2,6-dicarboxylate,
bis(2-dimethylaminoethyl)anthraquinone-2,7-dicarboxylate,
bis(3-piperidinopropyl)anthraquinone-1,5-dicarboxylate,
bis(4-pyrrolidinobutyl)anthraquinone-2,6-dicarboxylate,
bis(3-morpholinopropyl)anthraquinone-2,6-dicarboxylate,
bis(4-dibut-3-enylaminobutyl)anthraquinone-1,8-dicarboxylate and
bis(3-dimethylaminopropyl)anthraquinone-2,7-dicarboxylate.

The expression "pharmaceutically acceptable acid addition salts" is intended to apply to any non-toxic organic or inorganic acid addition salts of the base compounds represented by formula (I). Illustrative inorganic acids which form suitable salts include hydrochloric, hydrobromic, sulphuric and phosphoric acid and acid metal salts such as sodium monohydrogen orthophosphate and potassium hydrogen sulfate. Illustrative organic acids which form suitable salts include the mono, di and tricarboxylic acids. Illustrative of such acids are, for example, acetic, glycolic, lactic, pyruvic, malonic, succinic, glutaric, fumaric, malic, tartaric, citric, ascorbic, maleic, hydroxymaleic, benzoic, hydroxybenzoic, phenylacetic, cinnamic, salicylic, 2-phenoxybenzoic and sulfonic acids such as methane sulfonic acid and 2-hydroxyethane sulfonic acid. Either the mono or the di-acid salts can be formed, and such salts can exist in either a hydrated or a substantially anhydrous form. In general, the acid addition salts of these compounds are crystalline materials which are soluble in water and various hydrophilic organic solvents and which in comparison to their free base forms, generally demonstrate higher melting points and an increased chemical stability.

The compounds of this invention can be prepared by one of the many known esterification or transesterification procedures. For example, the bis (tertiary aminoalkyl) esters can be prepared by reacting the anthraquinone dicarboxylic acid with a tertiary aminoalkyl halide in which the aminoalkyl portion represented by the structure

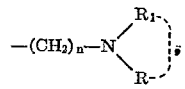

is as previously defined. Alternatively, a reactive salt of the anthraquinone dicarboxylic acid, such as the sodium or silver salt, may be substituted for the free acid. The various anthraquinone dicarboxylic acids used as starting materials are readily prepared by the acid hydrolysis of their corresponding dicyanoanthraquinones, which in turn, may be prepared from their corresponding dichloranthraquinones, E. A. Coulson, J. Chem. Soc., *1930*, 1932. The esterification reaction can be run at temperatures ranging from room temperature to the reflux temperature of the solvent employed for periods ranging from one hour to 5 days. The reaction may also be conducted in the presence of catalysts, as for example, benzyltrimethylammonium chloride, which may be present in catalystic or stoichiometric amounts. Preferably, esterification of the anthraquinone dicarboxylic acid with an aminoalkyl halide takes place at the reflux temperature of isopropyl alcohol in the presence of a catalytic amount of benzyltrimethylammonium chloride for a period of from 6 to 18 hours.

The instant compounds, including the bis (primary and secondary aminoalkyl) esters, are prepared by reacting an anthraquinonedicarbonyl halide with an aminoalkanol or an acid addition salt of an aminoalkanol as previously indicated in the above reaction sequence. The reaction favors the use of 2 or more moles of the aminoalkanol or a salt thereof for each mole of the anthraquinonedicarbonyl halide employed. The reaction is conducted over a wide range of temperatures and reaction times, generally between 20° C., and the reflux temperature of the particular solvent selected, for periods of time ranging from about 1 to about 24 hours. A wide range of solvents may be employed with chloroform, benzene and tetrahydrofuran (which has been dried and from which alcohols have been removed) being the solvents of choice. Preferably, the reaction is run for approximately 2 hours at the reflux temperature of the particular solvent selected. In those instances in which R and/or $R_1$ is hydrogen, the primary or secondary amine should be blocked as with the formation of a salt, or by a substitution with a readily removable blocking group, such as the carbobenzoxy group, so that rearrangement to the coresponding amide may be avoided.

The compounds of the present invention may also be prepared via a transesterification reaction in which a lower alkyl ester of anthraquinone dicarboxylic acid is caused to react with an appropriate aminoalkanol under suitable conditions. Such a reaction is reversible and catalyzed by alkaline or acid catalysts, as for example, toluenesulfonic acid. The compounds of the present invention are favored by causing a shift in the equilibrium to take place as, for example, by the removal of the lower alkanol product formed either by distillation or by co-distillation with an appropriate solvent. Alternatively, the equilibrium can be favorably shifted by employing a large excess of the transesterification aminoalkanol reagent. Preferably, the reaction is carried out by removing the lower alkanol formed with an alkaline catalyst, whereas when R and/or $R_1$ is hydrogen an acid catalyst is preferred. Suitable alkaline catalysts include alkali metals, such as sodium or potassium, alkali lower alkoxides, such as sodium ethoxide, and alkali amides such as sodium or lithium amide. Particularly useful solvents are those which form azeotropic distillation mixtures with the lower alkanols, as for example, toluene or benzene, or those solvents which boil at a sufficiently higher temperature than the alkanol to be removed.

The compounds of the present invention are antiviral agents. Preferably they are administered to an animal host to prevent or inhibit viral infections. The term host refers to any viable biological material or intact animal including humans which is capable of inducing the formation of interferon and which serves as a support means for virus replication. The host can be of animal or mammalian origin. Illustratively such hosts include birds, mice, rats, guinea pigs, gerbils, ferrets, dogs, cats, cows, horses and humans. Other viable biological material such as used in the production of vaccines may also act as a host. Thus, tissue cultures prepared from organ tissues, such as mammalian kidney or lung tissue, as well as tissue cultures prepared from embryo tissue, such as obtained from amniotic cells or chick allantoic fluid, have been found to be useful hosts.

The treatment of virus infections for purposes of the present invention encompasses both the prevention and the inhibition of characteristic disease symptoms in a mammalian host susceptible to invasion by a pathogenic virus. Illustrative of mammalian virus infections which can be prevented or inhibited by the administration of the compounds of the present invention are infections caused by picornaviruses, such as encephalomyocarditis virus; myxoviruses, such as influenza $A_2$ (Jap/305) virus; arboviruses; such as Semliki forest virus; the herpes group of viruses, including herpes simplex; and the poxviruses, as for example, vaccinia IHD. Thus, for example, the compounds of the present invention when administered orally or subcutaneously to mice in varying doses either shortly prior or subsequent to a fatal inoculation of a neurotropic virus such as encephalomyocarditis virus, having a $LD_{50}$ anywhere from 5 to 50, delay or prevent completely the onset of death. Salts of these compounds are generally administered in compositions containing a 0.15% aqueous hydroxyethylcellulose vehicle, whereas the free base compounds are generally administered in compositions containing a 10% aqueous surfactant vehicle in order to help solubilize the compound. In general, ten mice are used for each treated group with an additional 20 mice serving as a control group. At the time of administration the test virus is titrated in order to determine the potency or $LD_{50}$ for the particular virus pool used as a challenge. The control animals are given a placebo containing the identical volume of vehicle without, of course, the active ingredient. Because of the lethal nature of the test system employed, the antiviral nature of the test compound is dramatically illustrated by a side by side comparison of the survival time of treated animals with the untreated control group of animals.

Respiratory viruses, such as influenza $A_2$ (Jap/305) virus, which are also lethal to the test animals employed, are administered via intranasal instillation. Animals infected in this manner have the active ingredients administered in the same manner as the test virus, and again a side by side comparison is made of the survivors of the animals treated with the untreated control animals.

Inexplicably, a mouse fatally infected with encephalomyocarditis or influenza virus occasionally survives without further treatment. This may be the result of a prior, interferon-induced infection in the mouse, or perhaps due to some genetic factor or other natural defense mechanism not presently understood. For this reason the control group selected is of sufficient size as to statistically reduce to a negligible amount the influence of such a chance survivor upon the test results.

The vaccinia test virus is typical of the dermatotrophic type viruses which respond to treatment with compositions containing the compounds of the instant invention. The vaccinia virus generally produces a non-fatal infection in mice, producing characteristic tail lesions when the virus is subcutaneously administered to the tail of the mouse. The instant compounds are administered either orally or subcutaneously either prior to or subsequent to the vaccinia infection. Tail lesions are subjectively scored on the eighth day following infection against untreated animals which serve as a control group. The compounds of the present invention have been found to be effective in varying degrees against one or all of these test virus systems.

The mode of activity of the active ingredients of the present invention is not rigorously defined. *Inter alia*, the compounds of the present invention may induce the formation of interferon in a viable host. Interferon is a biological substance of unknown chemical structure, presumably proteinaceous in nature, which is produced by host cells in response to a viral infection. The interferon so produced acts to induce a virus inhibiting substance, which inhibits in some yet unknown manner the intarcellular replication of the virus without appearing to have any inactivation effect *per se* upon the virus itself. A few of the viruses susceptible to interferon replication inhibition are described in Horsfall and Tamm, "Viral and Rickettsial Infections of Man," 4th Edition (1965), J. B. Lippincott Company, pp. 328–9.

As previously indicated, the compounds of the present invention may be prophylactically administered in order to prevent the spread of contagious viral diseases or they may be therapeutically administered to a host already infected intended for their curative effect. When administered prophylactically, it is preferred that the administration be made within 0 to 96 hours prior to the infection of the host animal with a pathogenic virus. When the compounds of the present invention are administered for their curative effect, it is preferred that they are administered within about 1 or 2 days following infection of the host in order to obtain the maximum therapeutic effect.

The dosage to be administered will be dependent upon such parameters as the particular virus for which either treatment or prophylaxis is desired, the species of animal involved, its age, health, weight, the extent of infection, concurrent treatment, if any, frequency of treatment and the nature of the effect desired. A daily dose of the active ingredients will generally range from about 0.1 mg. to about 500 mg. per kg. of body weight. Illustratively dosage levels of the administered active ingredients for intravenous treatment range from about 0.1 mg. to about 10 mg. per kg. of body weight; for intraperitoneal administration range from about 0.1 mg. to about 50 mg. per kg. of body weight; for subcutaneous administration range from about 0.1 mg. to about 250 mg. per kg. of body weight; for oral administration may be from about 0.1 mg. to about 500 mg. per kg. of body weight; for intranasal instillation range from about 0.1 mg. to about 10 mg. per kg. of body weight; and for aerosol inhalation therapy, the range is generally from about 0.1 mg. to about 10 mg. per kg. of body weight.

The novel compounds described herein can also be administered in various different dosage unit forms, e.g., oral compositions such as tablets, capsules, dragees, lozenges, elixirs, emulsions, clear liquid solutions and suspensions; parenteral compositions such as intramuscular, intravenous or intradermal preparations; and topical compositions, such as lotions, creams or ointments. The amount of active ingredient contained in each dosage unit form will, of course, vary widely according to the particular dosage unit employed, the animal host being treated, and the nature of the treatment, i.e., whether prophylactic or therapeutic in nature. Thus, a particular dosage unit may contain from about 2.0 mg. to over 3.0 g. of active ingredient in addition to the pharmaceutical excipients contained therein.

The novel compounds described herein can be employed in conjunction or admixture with additional organic or inorganic pharmaceutical excipients. Suitable solid excipients include gelatin, lactose, starches, magnesium stearate and petrolatum. Suitable liquid excipients include water and alcohols such as ethanol, benzyl alcohol and the polyethylene alcohols either with or without the addition of a surfactant. In general, the preferred liquid excipients particularly for injectable preparations, include water, saline solution, dextrose and glycol solutions such as an aqueous propylene glycol or an aqueous solution of polyethylene glycol. Liquid preparations to be used as sterile injectable solutions will ordinarily contain from about 0.5% to about 25% by weight, and preferably from about 1% to about 10% by weight, of the active ingredient in solution. In certain topical and parenteral preparations, various oils are utilized as carriers or excipients. Illustrative of such oils are mineral oils, glyceride oils such as lard oil, cod liver oil, peanut oil, sesame oil, corn oil and soybean oil.

A preferred method for administration for the compounds of the present invention is orally either in a solid dose form such as a tablet or capsule, or in a liquid dose form such as an elixir, suspension, emulsion or syrup. Ordinarily the active ingredient comprises from about 0.5% to about 10% by weight of an oral liquid composition. In such compositions, the pharmaceutical carrier is generally aqueous in nature, as for example, aromatic water, a sugar-based syrup or a pharmaceutical mucilage. For insoluble compounds suspending agents may be added as well as agents to control viscosity, as for example, magnesium aluminum silicate or carboxymethylcellulose. Buffers, preservatives, emulsifying agents and other excipients can also be added.

For parenteral administration such as intramuscular intravenous or subcutaneous administration, the proportion of active ingredient ranges from about 0.05% to about 20% by weight, and preferably from about 0.1% to about 10% by weight of the liquid composition. In order to minimize or eliminate irritation at the site of injection, such compostions may contain a non-ionic surfactant having a hydrophile-lipophile balance (HLB) of from about 12 to about 17. The quantity of surfactant in such formulations ranges from about 5% to about 15% by weight. The surfactant can be a single component having the above identified HLB, or a mixture of two or more components having the desired HLB. Illustrative of surfactants useful in parenteral formulations are the class of polyoxyethylene sorbitan fatty acid esters as, for example, sorbitan monooleate and the high molecular weight adducts of ethylene oxide with a hydrophobic base, formed by the condensation of propylene oxide with propylene glycol. The concentration of active ingredient contained in these various parenteral dosage unit forms varies over a broad range and comprises anywhere from about 0.05% to about 20% by weight of the total formulation, the remaining component or components comprising excipients previously mentioned.

The active ingredients of the present invention can also be admixed directly with animal feeds or incorporated into the drinking water of animals. For most purposes, an amount of active ingredient is used which provides from about 0.0001% to about 0.1% and preferably, from about 0.001% to about 0.02% by weight of the active ingredient based upon the total weight of feed intake. The active ingredients can be admixed in animal feed concentrates, suitable for use by farmers or livestock growers for incorporation in appropriate amounts with the final animal feeds. These concentrates ordinarily comprise from about 0.5% to about 95% by weight of the active ingredient compounded with a finely divided solid carrier or flour, such as wheat, corn, soybean or cottonseed flour. Depending upon the particular animal to be fed, nutrients and fillers may also be added such as ground cereal, charcoal, fuller's earth, oyster shells and finely divided attapulgite or bentonite.

The active ingredients of the present invention can be packaged in a suitable pressurized container together with an aqueous or volatile propellant for use as an aerosol. A suitable discharge valve is fitted to an opening in the container from which the active ingredients may be conveniently dispensed in the form of a spray, liquid, ointment or foam. Additional adjuvants such as co-solvents, wetting agents and bactericides may be employed as necessary. Normally, the propellant used is a liquified gaseous compound, preferably a mixture of low molecular weight fluorinated hydrocarbons. These haloalkanes are preferred because of their compatibility with the active ingredients of the present invention, and because they are non-irritating when applied to skin surfaces. Other useful propellants include ethylene oxide, carbon dioxide, propane and nitrogen gas.

The invention described herein is more particularly illustrated by means of the following specific examples:

EXAMPLE I

1,5-Dicyanoanthraquinone

A suspension of 100 g. (0.36 mole) of 1,5-dichloroanthraquinone, 80 g. (0.89 mole) of cuprous cyanide and 300 g. of benzyl cyanide is heated at the reflux temperature for 30 minutes. The reaction mixture is cooled to 80° C., filtered, washed several times with benzyl cyanide, rinsed with acetone and air-dried to give 83.7 g. of 1,5-dicyanoanthraquinone as an olive drab colored material having a m.p. greater than 300° C.

Following essentially the same procedure 1,8-dicyanoanthraquinone is prepared from the corresponding 1,8-dichloroanthraquinone. The 2,6-dicyanoanthraquinone isomer can also be prepared from the corresponding 2,6-dichloroanthraquinone with the proviso that diphenylacetonitrile is substituted for the benzyl cyanide above and the reaction is conducted at 315–29° C., for a period of 10 minutes.

EXAMPLE II

Anthraquinone-1,5-dicarboxylic acid

A mixture of 83.2 g. (0.32 mole) of 1,5-dicyanoanthraquinone, 50 ml. of water and 155 ml. of concentrated sulfuric acid is stirred and heated to 225° C., whereupon the reaction mixture turns to a solid mass. The reaction mixture is allowed to slowly cool, and is diluted with an additional 750 ml. of water. The reaction mixture is filtered, and the residue dissolved in 450 ml. of water to which 140 ml. of a 20% sodium hydroxide solution has been added. The filtrate is treated with charcoal, filtered through diatomaceous earth and the filtrate acidified to congo Red using concentrated hydrochloric acid. The anthraquinone-1,5-dicarboxylic acid so prepared yields 81.4 g. of a light tan solid having a m.p. above 300° C.

Following essentially the same procedure anthraquinone-1,8-dicarboxylic acid and anthraquinone-2,6-dicarboxylic acid are prepared from the corresponding dicyanoanthraquinones.

EXAMPLE III

Bis(3-dibutylaminopropyl)anthraquinone-1,8-dicarboxylate-dihydrochloride

A suspension of 15.0 g. (0.05 mole) of anthraquinone-1,8-dicarboxylic acid, 24.7 g. (0.12 mole) of 3-dibutylaminopropyl chloride and 500 ml. of isopropyl alcohol is refluxed for a period of 3 hours. A catalytic amount, 0.3 ml., of a 60% aqueous solution of benzyltrimethylammonium chloride is added and the mixture heated to reflux temperature for an additional 21 hours. The volatile materials are removed from the reaction mixture in vacuo and the residue dissolved in chloroform. The chloroform solution is washed with two successive 100 ml. portions of a saturated sodium bicarbonate solution, washed with water, dried over anhydrous sodium sulfate, filtered, treated with activated charcoal, and filtered through a bed of diatomaceous earth. The filtrate is acidified to Congo Red using an ethereal hydrochloric acid solution and the volatile solvents removed in vacuo. The resulting oil is triturated with ether, allowed to stand for several days and triturated with ethyl acetate. The bis(3-dibutylaminopropyl) anthraquinone-1,8-dicarboxylate dihydrochloride so prepared, when recrystallized twice from ethyl acetate results in a product having a m.p. (vac.) 136–8° C., $$\lambda^{H_2O}_{max.} 256, \text{ and } E^{1\%}_{1\,cm.} 505.$$

Following essentially the same procedure, but substituting anthraquinone-2,6-dicarboxylic acid or anthraquinone-1,5-dicarboxylic acid in lieu of the anthraquinone-1,8-dicarboxylic acid above, results in the formation of bis(3-dibutylaminopropyl)anthraquinone-2,6-dicarboxylate dihydrochloride having a m.p. 199–200° C., $$\lambda^{0.1N\ HCl}_{max.} 261; \text{ and } E^{1\%}_{1\,cm.} 847$$

and bis(3-dibutylaminopropyl)anthraquinone-1,5-dicarboxylate dihydrochloride having a m.p. 208–9° C., $$\lambda^{H_2O}_{max.} 256, \text{ and } E^{1\%}_{1\,cm.} 529,$$

respectively.

EXAMPLE IV

Bis(3-diethylaminopropyl)anthraquinone-2,6-dicarboxylate dihydrochloride

A mixture of 6.3 g. (0.021 mole) of anthraquinone-2,6-dicarboxylic acid, 7.6 g. (0.051 mole) of 3-diethylaminopropyl chloride and 450 ml. of isopropyl alcohol are refluxed for a period of 48 hours. The reaction mixture is evaporated to dryness in vacuo and the residue dissolved in deionized water. The resulting solution is filtered and the filtrate rendered alkaline to phenolpthalein indicator using a 20% sodium hydroxide solution. The resulting mixture containing some solid material is extracted several times in chloroform. The combined chloroform extracts are washed twice with water, dried over anhydrous sodium sulfate, filtered and the filtrate acidified to Congo Red with ethereal hydrogen chloride. Upon concentrating the mixture, a solid is obtained which is recrystallized twice from ethanol to give the desired bis(3-diethylaminopropyl)anthraquinone-2,6-dicarboxylate dihydrochloride having a m.p. 264–5° C., (dec.), $$\lambda^{0.1N\ HCl}_{max.} 261, E^{1\%}_{1\,cm.} 999.$$

Following essentially the same procedure but substituting 1-(3-chloropropyl)piperidine, 2-chloroethyl-N-cyclohexyl-N-methylamine and 2-chloroethyldiallylamine in lieu of the γ-diethylaminopropyl chloride above, results in the formation of bis(3-piperidinopropyl)anthraquinone-2,6-dicarboxylate dihydrochloride, bis(2-N-cyclohexyl-N-methylaminoethyl)anthraquinone-2,6-dicarboxylate dihydrochloride and bis(2-diallylaminoethyl)anthraquinone-2,6-dicarboxylate dihydrochloride, respectively.

EXAMPLE V

Bis(3-dibutylaminopropyl)anthraquinone-2,7-dicarboxylate dihydrochloride

Anthraquinone-2,7-dicarbonyl chloride 36 g. (0.1 mole) dissolved in 1 liter of tetrahydrofuran (stored over molecular sieves) is stirred and treated with 37.5 g. (0.20 mole) of dry 3-dibutylaminopropanol. The reaction mixture is stirred and heated to its reflux temperature for a period of 6 hours. The resulting mixture is treated with ethereal hydrochloric acid to convert the product to its dihydrochloride salt and the desired bis(3-dibutylaminopropyl) anthraquinone-2,7-dicarboxylate dihydrocholride isolated essentially as previously described.

EXAMPLE VI

Bis(3-dimethylaminobutyl)anthraquinone-2,6-dicarboxylate dihydrochloride

Diethylanthraquinone-2,6-dicarboxylate 35.2 g. (0.1 mole), prepared from corresponding bis-acid by conventional methods, is dissolved in 400 ml. of dry xylene to which is added 50 ml. of 3-dibutylaminopropanol and 0.2 g. of metallic sodium. The reaction flask is connected to a fractionation column and the stirred reaction mixture is slowly distilled to remove the ethanol which forms. After approximately 150 ml. of distillate is collected, the reaction mixture is treated by conventional methods previously described and the desired bis(3-dimethylaminobutyl)anthraquinone-2,6-dicarboxylate isolated as its dihydrochloride salt.

EXAMPLE VII

The following Example is illustrative of the antiviral activity for the compounds of the present invention.

Thirty mice weighing approximately 12 to 15 gms. each are divided into two groups, a control group of 20 animals and a test group of 10 animals. All of the animals are challenged with a fatal dose ($26LD_{50}$) of encephalomyocarditis virus. The test group of animals is tested both prophylactically and therapeutically using a parenteral composition containing bis(3-dibutylaminopropyl)-9,10-dihydro-9,10-dioxoanthracene-2,6-dicarboxylate dihydrochloride hemihydrate as the active ingredient dissolved in a solution of 0.15% aqueous hydroxyethylcellulose solution as the vehicle. The composition contains the active ingredient in an amount such that each dosage contains 0.25 ml. which is equivalent to a dose level of 10 mg. per kg. The control group receives a subcutaneous placebo containing the same volume of vehicle without the active ingredient. Observations over a 10 day period show the termination of all of the control animals within a period of from 4 to 5 days, with the treated group surviving for a substantially longer period of time.

EXAMPLE VIII

Preparation of a tablet formulation

An illustrative preparation of 10,000 tablets, each containing 100 mg. of bis(3-dibutylaminopropyl)anthraquinone-2,6-dicarboxylate dihydrochloride hemihydrate is prepared as follows:

|     |     | Gm. |
| --- | --- | --- |
| (a) | Bis(3-dibutylaminopropyl)anthraquinone - 2,6-dicarboxylate dihydrochloride hemihydrate | 1000 |
| (b) | Lactose | 1000 |
| (c) | Starch paste (10% w/v starch in water) | 100 |
| (d) | Starch | 32.5 |
| (e) | Calcium stearate | 6.5 |

The active ingredient is uniformly mixed with the lactose and granulated by the addition of the starch paste. The granules which form are dried at 120° F., for 20 hours and forced through a No. 16 screen. The granules are lubricated by the addition of the starch and calcium stearate and compressed into tablets. Each tablet so prepared contains 100 mg. of the active ingredient.

EXAMPLE IX

Preparation of a capsule formulation

An illustrative composition for the preparation of 1000 two-piece hard gelatin capsules, each capsule containing 100 mg. of bis(3-dibutylaminopropyl)anthraquinone-2,7-dicarboxylate dihydrochloride is prepared as follows:

|     |     | Gm. |
| --- | --- | --- |
| (a) | Bis(3 - dibutylaminopropyl)anthraquinone - 2,7-dicarboxylate dihydrochloride | 100 |
| (b) | Corn starch | 150 |
| (c) | Magnesium stearate | 25 |

1000 Hard gelatin capsules

The finely powdered ingredients are mixed until uniformly dispersed and then filled into hard shelled gelatin capsules of the appropriate size.

In a similar fashion, soft gelatin capsules may be prepared in which the above composition can be granulated, slugged or directly compressed in a rotary die or plate mold in which the soft gelatin capsule is formed. Alternatively, the above excipients may be omitted and the active ingredient dispensed as a powder directly into the soft gelatin capsule.

EXAMPLE X

Preparation of an oral syrup formulation

A 2% weight per volume syrup of bis(3-diethylaminopropyl)anthraquinone - 2,6-dicarboxylate dihydrochloride is prepared in accordance with the usual pharmaceutical techniques which have the following formula:

|     |     | Gm. |
| --- | --- | --- |
| (a) | Finely divided bis(3 - diethylaminopropyl)anthraquinone-2,6-dicarboxylate dihydrochloride | 2.0 |
| (b) | Sucrose | 33.3 |
| (c) | Chloroform | 0.25 |
| (d) | Sodium benzoate | 0.4 |
| (e) | Methyl p-hydroxybenzoate | 0.02 |
| (f) | Vanillin | 0.04 |
| (g) | Glycerol | 1.5 |
| (h) | Purified water to 100.0 ml. | |

EXAMPLE XI

Preparation of an ointment formulation

One thousand grams of an ointment for topical application containing 1.0% of bis(3-dibutylaminopropyl)anthraquinone-1,5-dicarboxylate dihydrochloride is prepared from the following ingredients:

|     |     | Gm. |
| --- | --- | --- |
| (a) | Bis(3 - dibutylaminopropyl)anthraquinone-1,5-dicarboxylate dihydrochloride | 10 |
| (b) | Light liquid petrolatum | 250 |
| (c) | Wool fat | 200 |
| (d) | White petroleum Q.s. 1000. | |

The wool fat, white petroleum and 200 gms. of the light liquid petrolatum are liquified and held at 110° F. The active ingredient is mixed with the remaining liquid petrolatum and passed through a colloid mill. After passing through the mill, the mixture is stirred into the melt, and the melt is permitted to cool with continued stirring until congealed.

EXAMPLE XII

Preparation of a parenteral formulation

An illustrative composition for an emulsion which is parenterally injectable is as follows:

| Each ml. contains— | Ingredients | Amount |
| --- | --- | --- |
| 50 mg. | Bis(3-dibutylaminopropyl)anthraquinone-2,6-dicarboxylate dihydrochloride. | 1.000 g. |
| 100 mg. | Polyoxyethylene sorbitan monooleate | 2.000 g. |
| 0.0064 | Sodium chloride | 0.128 g. |
|  | Water for injection, Q.s | 20.000 ml. |

The parenteral composition is prepared by dissolving 0.64 g. of sodium chloride in 100 ml. of water suitable for injection. The polyoxyethylene sorbitan monooleate is mixed with the active ingredient, and an amount of the previously prepared aqueous sodium chloride solution added which is sufficient to bring the total volume to 20 ml. The resulting solution is shaken and autoclaved for 20 minutes at 110° C., at 15 p.s.i.g. steam pressure. The composition can be dispensed in single ampule for use in multiple dosages or it can be dispensed at 10 to 20 individual ampules for use as a single dosage unit.

We claim:

1. A bis-basic ester of anthraquinone having the general formula:

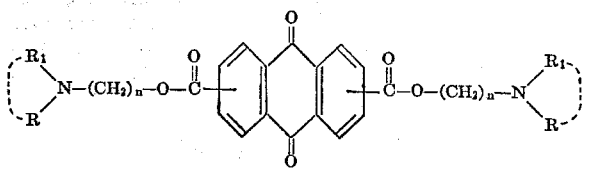

wherein $n$ is an integer of from 2 to 6; R and $R_1$ are each selected from the group consisting of hydrogen, lower alkyl having from 1 to 6 carbon atoms, cycloalkyl having from 3 to 6 carbon atoms, alkenyl having from 3 to 6 carbon atoms in which the unsaturation is in a position other than in the 1-position of the alkenyl group, and when R and $R_1$ are taken together with the nitrogen atom to which they are attached represent the pyrrolidinyl, piperidino or morpholino radicals; and the pharmaceutically acceptable acid addition salts thereof.

2. A compound of claim 1 wherein each R and $R_1$ is a lower alkyl group having from 1 to 6 carbon atoms.

3. The compound bis(3-dibutylaminopropyl)anthraquinone-1,8-dicarboxylate and its pharmaceutically acceptable acid addition salts.

4. The compound bis(3-dibutylaminopropyl)anthraquinone-1,5-dicarboxylate and its pharmaceutically acceptable acid addition salts.

5. The compound bis(3-dibutylaminopropyl)anthraquinone-2,6-dicarboxylate and its pharmaceutically acceptable acid addition salts.

6. The compound bis(3-diethylaminopropyl)anthraquinone-2,6-dicarboxylate and its pharmaceutically acceptable acid addition salts.

References Cited
UNITED STATES PATENTS 3,647,860    3/1972    Sill et al.    260—326.25

LORRAINE A. WEINBERGER, Primary Examiner

E. J. SKELLY, Assistant Examiner

U.S. Cl. X.R.

260—246 B, 272, 326.25; 424—248, 267, 274, 308